United States Patent [19]
Oliva

[11] Patent Number: 5,267,707
[45] Date of Patent: Dec. 7, 1993

[54] DRAG ADJUSTMENT MECHANISM FOR FISHING REELS

[76] Inventor: Richard A. Oliva, 3318 Club Dr., Los Angeles, Calif. 90064

[21] Appl. No.: 702,419

[22] Filed: May 20, 1991

[51] Int. Cl.$^5$ ............... A01K 89/015; A01K 89/033
[52] U.S. Cl. ................................. 242/268; 242/302
[58] Field of Search ............... 242/268, 267, 283, 302, 242/264, 265, 266, 323

[56] References Cited

U.S. PATENT DOCUMENTS

| | | | |
|---|---|---|---|
| 804,047 | 11/1905 | Rockwell | 242/267 |
| 1,495,676 | 5/1924 | Coxe | 242/268 X |
| 1,603,306 | 10/1926 | Adams | 242/267 X |
| 1,890,736 | 12/1932 | Lenz | 242/267 X |
| 1,940,593 | 12/1933 | Henze . | |
| 2,209,598 | 7/1940 | Coxe . | |
| 2,335,752 | 11/1943 | Geiger | 242/323 |
| 2,783,862 | 3/1957 | Perinoni . | |
| 3,083,929 | 4/1963 | Sarah | 242/267 |
| 3,239,162 | 3/1966 | Henze . | |
| 3,659,807 | 5/1972 | Fleischer . | |
| 3,810,592 | 5/1974 | Host . | |
| 4,526,331 | 7/1985 | Tunks . | |
| 4,616,792 | 10/1986 | Tunks . | |
| 4,741,489 | 5/1988 | Emura et al. | 242/268 |
| 4,840,327 | 6/1989 | Kaneko | 242/268 X |
| 4,878,633 | 11/1989 | Morimoto . | |
| 4,930,722 | 6/1990 | Toda . | |

Primary Examiner—Katherine Matecki
Attorney, Agent, or Firm—Kelly Bauersfeld & Lowry

[57] ABSTRACT

A friction drag adjustment mechanism is provided for fishing reels to adjust friction drag quickly and easily between a pair of selected reference set points. The adjustment mechanism comprises a short bracket arm mounted onto a fishing reel at an outboard side of a reel handle to project radially outwardly from the rotational axis of the reel handle. A stop pin on the bracket arm is adapted to protrude in an inboard direction to a position between a selected adjacent pair of outwardly radiating spokes on so-called star wheel of a star-type drag adjustment assembly. The stop pin functions to restrict star wheel rotation for drag adjustment to a limited part-circle motion, such that the adjacent star wheel spokes respectively contact the stop pin at opposite end limits of such part-circle rotation to define the pair of reproducible reference set points.

14 Claims, 4 Drawing Sheets

DRAG ADJUSTMENT MECHANISM FOR FISHING REELS

BACKGROUND OF THE INVENTION

This invention relates generally to improvements in friction drag adjustment mechanisms in fishing reels and the like. More particularly, this invention relates to a relatively simple and economical device for permitting a star-type drag adjustment assembly to be adjusted quickly and easily between a pair of selected and reproducible reference set points.

Drag adjustment mechanisms in fishing reels are, in general terms, well known in the art for use in variably selecting the drag tension or resistance force applied to a fishing line. That is, modern fishing reels typically include a spool of line in conjunction with a reel handle which is rotated by the fisherman to wind the line onto the spool. A friction drag or clutch assembly is commonly interposed between the spool and reel handle to permit additional line to unwind from the spool with a selected resistance force referred to as drag tension. This drag feature permits a hooked fish to pull line from the fishing reel to avoid breaking the line and for purposes of tiring the fish. The particular drag tension setting is chosen in accordance with test strength of the line in use in combination with the anticipated type and size of fish to be caught.

More particularly, the drag tension setting is normally chosen at the time the fishing line is initially dropped into the water, with the specific setting providing a tension force approximately equal to 25% to 30% of the line test strength. However, when a fish is caught, the actual drag tension applied to the line will vary as an inverse function of the spool diameter. For example, in the event that a large fish draws a substantial length of the fishing line from the reel, the effective spool diameter can decrease significantly to result in a correspondingly significant increase in drag tension. It is therefore sometimes desirable to adjust the drag tension while a fish is on the line. In the foregoing example, it may be desirable to decrease the drag tension setting in the course of substantial line being taken from the spool, and thereafter to increase the drag setting as the line is wound back onto the spool. In this context, it can be important and desirable to readjust the drag setting to the initial set point position.

In the past, fishing reels equipped with drag adjustment assemblies have included relatively complex and costly mechanisms for adjusting line drag tension between preset positions. Such fishing reels having preset drag tension capabilities have generally been designed for ocean fishing and/or for catching relatively large fish, and have been sufficiently costly such that they are not widely used by many fisherman. An alternative drag adjustment assembly known commonly as a star-type mechanism incorporates a spoked adjustment wheel at the inboard side of a reel handle to adjust drag tension by compression action through a stack of clutch disks. Star-type adjustment mechanisms are widely used on less costly fishing reels and beneficially permit simple drag tension adjustment, but generally do not accommodate drag adjustment with respect to one or more reference set point positions. Attempts in the past to adapt star-type mechanisms to include reference point positions have involved relatively complicated arrangements requiring significant mechanism modifications and thus have not been suited for simple retrofit of existing units. See, for example, U.S. Pat. No. 3,239,162.

The present invention provides an improved drag adjustment mechanism for a fishing reel, wherein a star-type drag adjustment assembly incorporates a relatively simple and easily mounted stop pin for providing a pair of reference set point positions, wherein the stop pin can be provided as an original equipment item or otherwise added as a retrofit item onto existing fishing reels.

SUMMARY OF THE INVENTION

In accordance with the invention, an improved friction drag adjustment mechanism is provided for fishing reels to permit rapid fishing line drag tension adjustment between a pair of selected reference set points. The improved drag adjustment mechanism includes a relatively simple bracket arm and stop pin adapted for mounting as an original equipment or retrofit item at the outboard side of a reel handle, with the stop pin positioned in operative association with outwardly radiating spokes on a so-called star wheel of a star-type drag adjustment assembly. The stop pin is positioned, preferably in a retractable manner, between a selected adjacent pair of star wheel spokes, such that the stop pin restricts star wheel rotation to a limited part-circle path. The stop pin is thus contacted by the adjacent star wheel spokes at the respective opposite end limits of the part-circle path to define the pair of reference set points.

In the preferred form of the invention, the bracket arm is mounted at the outboard side of the reel handle by means of a reel nut. The bracket arm projects radially outwardly from the reel handle in a direction generally perpendicular to a reel handle rotational axis, and in a radial direction which can be selectively adjusted by rotating the bracket arm with the reel nut loosened. The stop pin is disposed generally at a distal end of the bracket arm and protrudes in an inboard direction to a position between a selected pair of adjacent star wheel spokes. In preferred forms of the invention, the stop pin is carried on the bracket arm for retractable movement between a first position projecting into the space between adjacent star wheel spokes, and a second or inoperative position retracted therefrom. In other preferred forms of the invention, the bracket arm and stop pin are movable in an outboard direction as a unit for retracting the stop pin to the second, inoperative position.

In use, when a drag tension setting is initially selected by rotation of the star wheel, the stop pin can be positioned between adjacent star wheel spokes and in contact with one of said spokes to define a reference set point corresponding with a maximum drag tension setting. The star wheel can thereafter be rotated at any time through a range of adjustment positions to decrease drag tension setting, with a lower end limit being defined upon contact of the other adjacent spoke with the stop pin. Moreover, the star wheel can be returned at any time to the initial drag setting position.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

Figure 9:
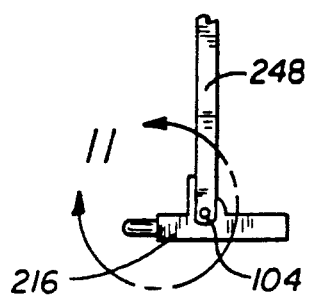
FIG. 9 is a fragmented plan view depicting a further alternative preferred embodiment of a bracket arm and stop pin for use in the invention, and showing the stop pin in an advanced or operative position.
Figure 10:
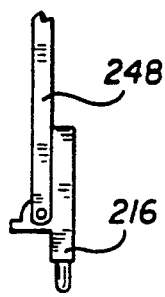
FIG. 10 is a fragmented plan view corresponding with the embodiment of FIG. 9, but showing the stop pin in a retracted or inoperative position.
Figure 12:
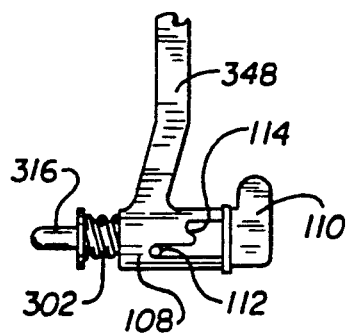
Figure 13:
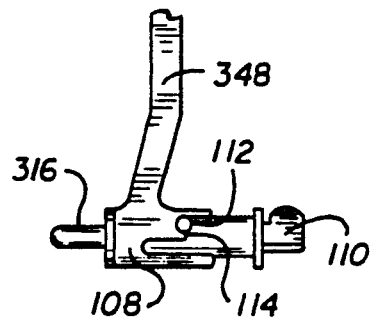

FIG. is an enlarged fragmented and partially sectioned plan view corresponding with the embodiment of FIGS. 9 and 10, and depicting internal construction details thereof;

FIG. 12 is a fragmented plan view generally similar to FIG. 9, but illustrating a further alternative preferred form of the invention with a stop pin in an advanced position; and FIG. 13 is a fragmented plan view corresponding with FIG. 12, and illustrating a stop pin in a retracted or inoperative position.

DETAILED DESCRIPTION OF THE PREFERRED EMBODIMENTS

Figure 1:
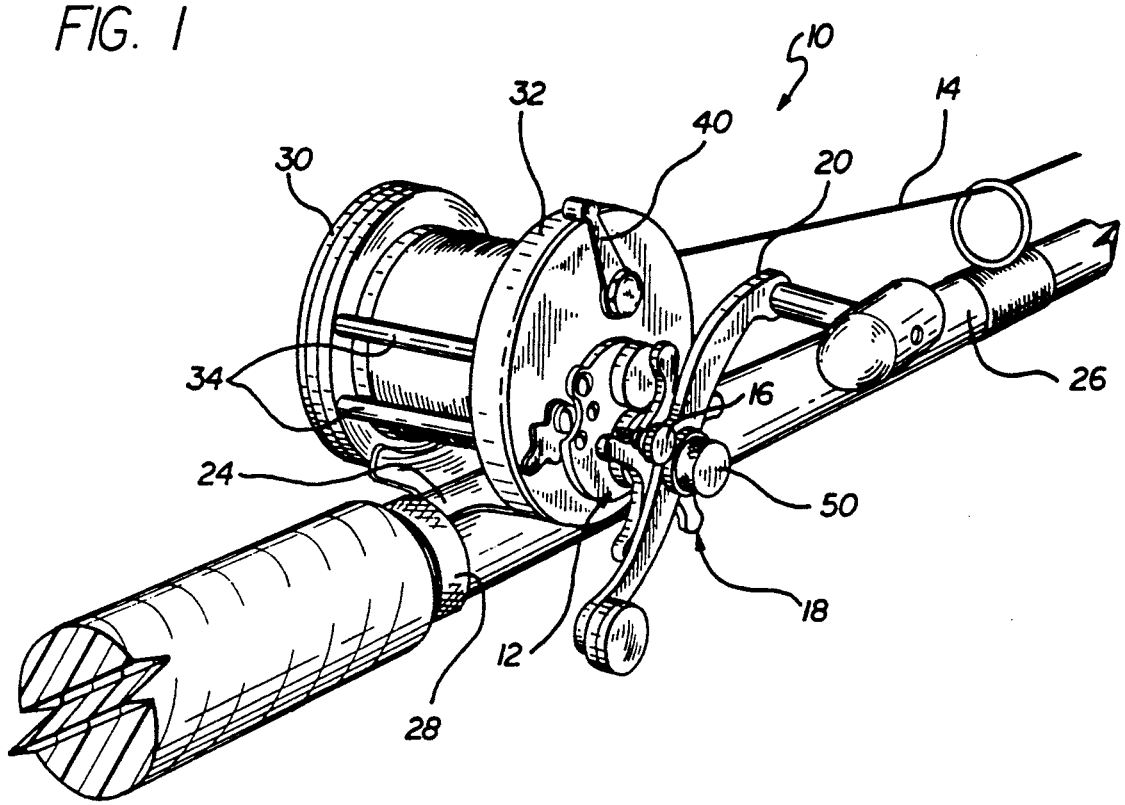
FIG. 1 is a fragmented perspective view illustrating a fishing rod and reel, wherein the reel incorporates an improved drag adjustment mechanism embodying the novel features of the invention.

As shown in the exemplary drawings, a fishing reel referred to generally in FIG. 1 by the reference numeral 10 includes an improved friction drag adjustment mechanism 12 for variably selecting a drag tension or resistance force applied to a fishing line 14 when the line is drawn or unwound from the reel 10. The improved adjustment mechanism 12 incorporates a relatively simple and easily manipulated stop pin 16 in association with a star-type drag adjustment wheel 18 to permit drag tension adjustment between two selected reference set point positions.

Figure 2:
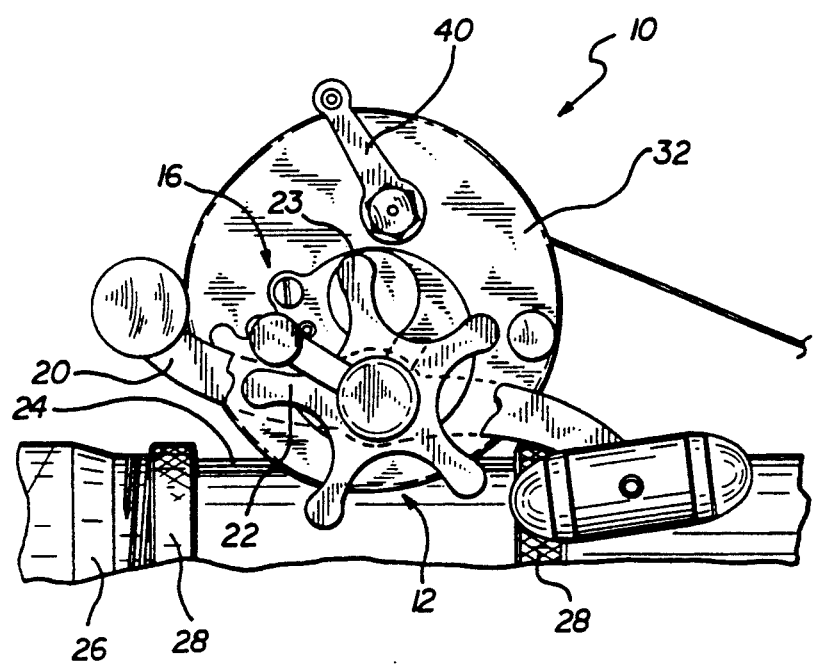
FIG. 2 is a fragmented right side elevational view of the rod and reel of FIG. 1.

The improved friction drag adjustment mechanism 12 of the present invention provides a simple and economical means for obtaining drag tension reference set points in an otherwise conventional drag adjustment assembly of the so-called star type. In this regard, the present invention provides the stop pin 16 which is mounted quickly and easily, and as an original equipment or retrofit item at an outboard side of a rotatable reel handle 20. The stop pin 16 is adapted to protrude in an inboard direction into operative association with the star wheel 18, at a radial position within the space between any selected adjacent pair of star wheel spokes 22 and 23 (FIG. 2). During operation, the stop pin 16 restricts the star wheel 18 to rotational movement for drag tension adjustment purposes within a limited part-circle path. The adjacent spokes 22 and 23 respectively engage the stop pin 16 at the opposite end limits of this path, wherein the positions of pin-spoke contact define the drag tension set point positions for the fishing reel.

Figure 3:
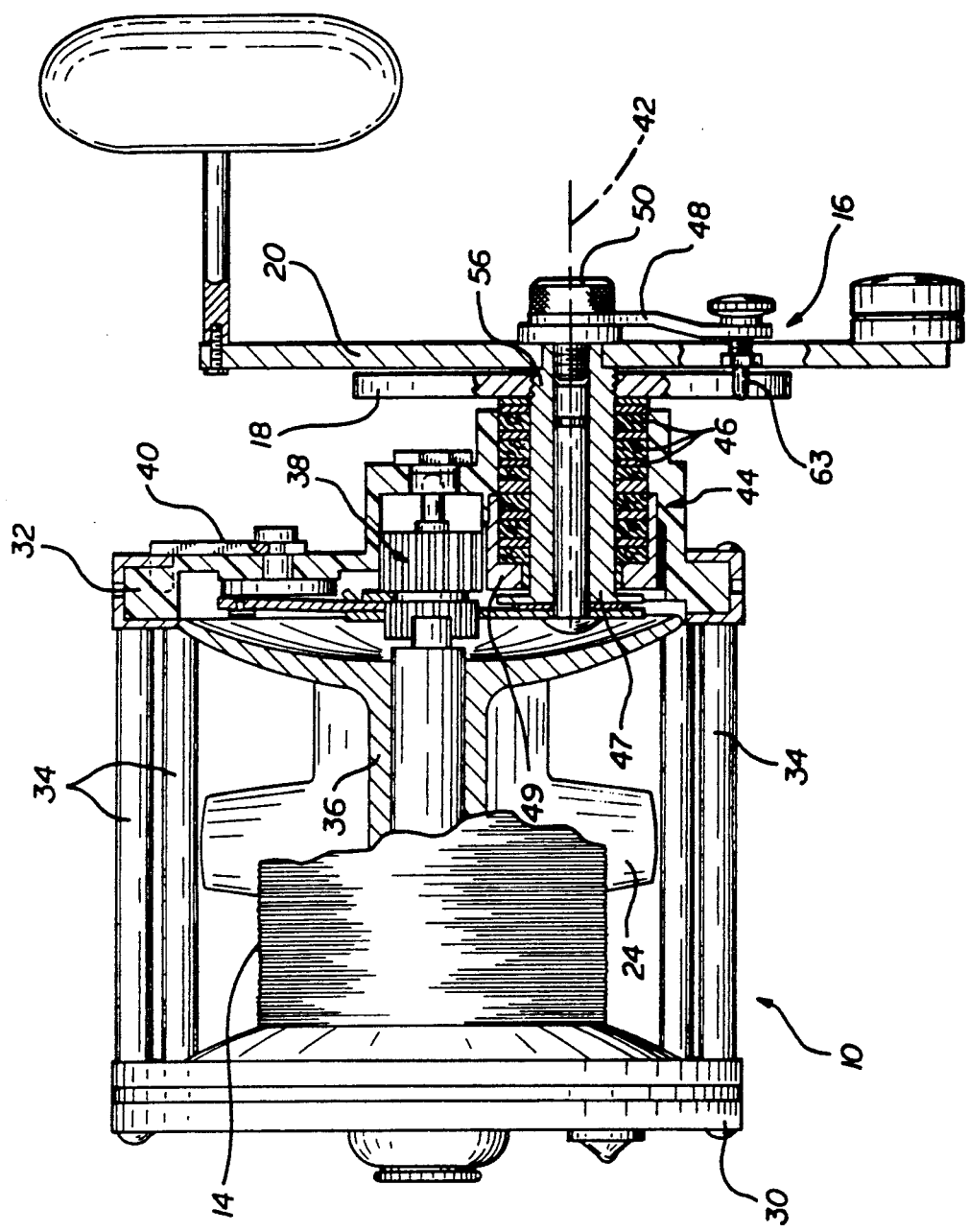
FIG. 3 is an enlarged fragmented sectional view depicting internal construction details of the fishing reel.

With general reference to FIGS. 1-3, the fishing reel 10 is shown to include a standard rod mounting plate 24 for removably anchoring the reel 10 onto a fishing rod 26 by means of lock nut sleeves 28 or the like. The rod mounting plate 24 is rigidly carried between a spaced apart pair of reel side plates 30 and 32, with additional spacer posts 34 maintaining these side plates in fixed spaced relation. The fishing line 14 is wound onto a spool 36 (FIG. 3) which is rotatably supported between the side plates 30 and 32.

As is known in the art, a train of gear elements referred to generally in FIG. 3 by the reference numeral 38 are interposed between the spool 36 and the reel handle 20. In use, and when properly engaged upon movement of an actuator lever 40 to the appropriate position, manual rotation of the reel handle 20 about an axis 42 operates the gear elements 38 in a manner rotating the spool 36 to draw or wind the fishing line 14 thereon. Importantly, the mechanical linkage between the reel handle 2 and the gear elements 28 includes a star-type drag adjustment assembly 44 (FIG. 3) of a type known in the art and as described, for example, in U.S. Pat. Nos. 1,940,593 and 3,239,162 which are incorporated by reference herein. This drag adjustment assembly 44 generally includes the star wheel 18 mounted rotatably at an inboard side of the reel handle 20 for variably selected a compression force applied to a stack of clutch disks 46. The clutch disks 46 regulate the rotational drive force transferred from the reel handle 20 via a sleeve shaft 47 to a drive gear 49, all in a manner known in the art with respect to star-type drag assemblies. Similarly, the clutch disks permit the line spool 36 to rotate relative to the reel handle 20 in a manner to unwind the line 14, while applying a drag tension or resistance force to such unwinding in accordance with the rotational position of the star wheel 18.

Figure 4:
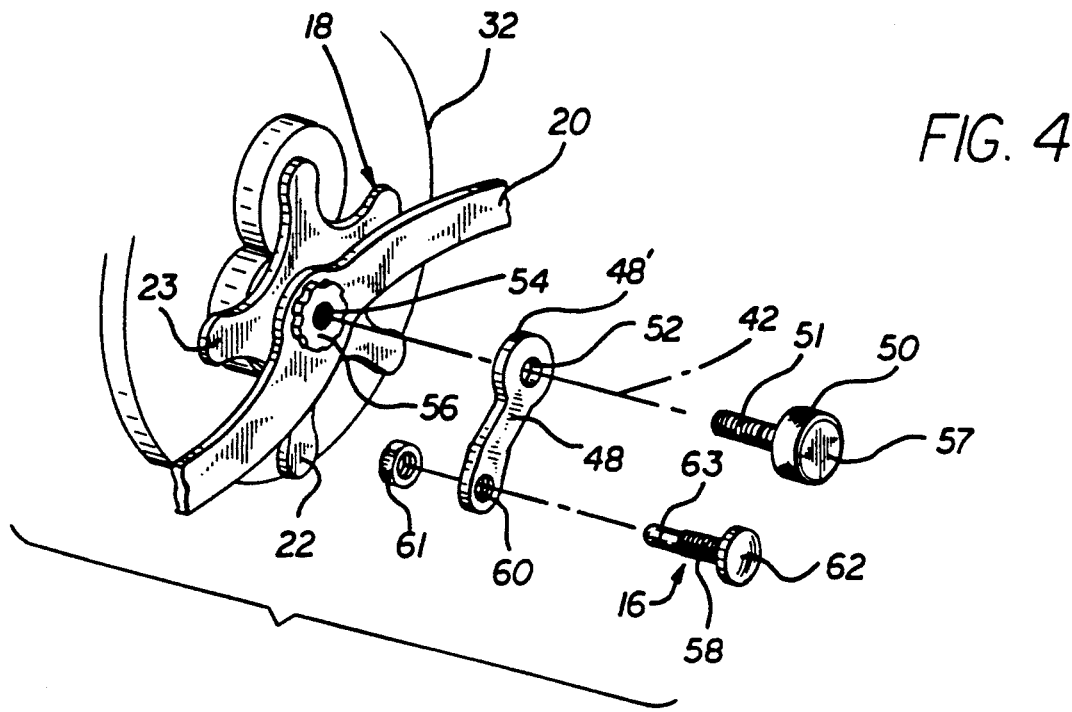
FIG. 4 is a fragmented and partially exploded perspective view depicting mounting of a bracket arm and stop pin in operative association with a star wheel of a star-type drag adjustment assembly.

In accordance with primary aspects of the invention, a bracket arm 48 is mounted at the outboard side of the reel handle 20 by means of a drag stop nut 50 or the like. In this regard, as shown best in FIG. 4, the illustrative drag stop nut 50 has a threaded shank 51 for passage through a central aperture 52 in a bracket arm hub 48', and for threaded advancement into a bore 54 in a handle screw 56 associated with the reel handle. An enlarged head 57 on the drag stop nut 50 is adapted to clamp the bracket arm hub 48' against an outboard face of the reel handle screw 56.

Figure 5:
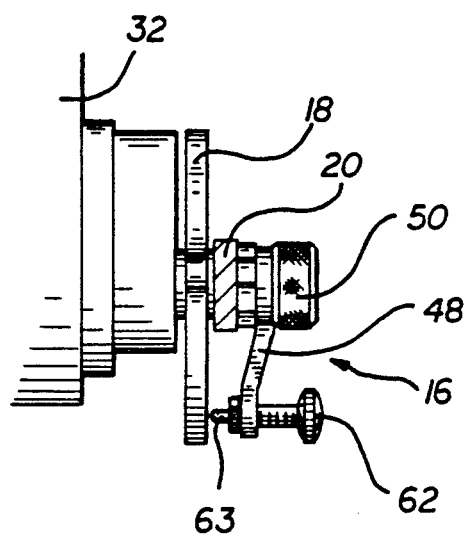
FIG. 5 is a fragmented and somewhat schematic plan view depicting the stop pin retracted to an inoperative position with respect to the star wheel.
Figure 6:
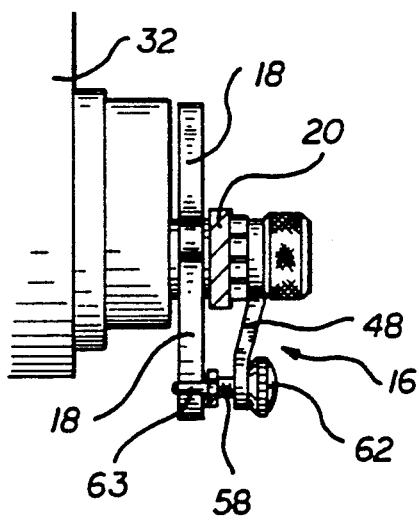
FIG. 6 is a fragmented and somewhat schematic plan view similar to FIG. 5, but showing the stop pin advanced into operative association with the star wheel.

The bracket arm 48 projects generally perpendicular to the reel handle axis 42 in a radially outward direction, terminating at a distal end adapted for supporting the stop pin 16. In one preferred form as viewed in FIGS. 1-6, the stop pin comprises a small nut having a threaded segment 58 which is threaded through a small bore 60 at the distal end of the bracket arm. A nut 61 cooperates with an enlarged head 62 on the stop pin to permit stop pin movement between operative and inoperative positions with respect to the star wheel 18. More specifically, FIG. 5 illustrates an unthreaded tip 63 of the stop pin 16 retracted from the star wheel 18 to permit free star wheel rotation and correspondingly unrestricted drag tension adjustment. By contrast, FIG. 6 illustrates the unthreaded tip 63 of the stop pin 16 advanced to a position between the adjacent star wheel spokes 22 and 23 for restricting star wheel rotation to a limited part-circle path.

In use, the stop pin 16 can be retracted to the inoperative position as viewed in FIG. 5 to permit unrestricted drag tension adjustment, such as prior to beginning fishing before the fishing line 14 is initially dropped into the water. When the selected initial drag tension force is obtained, the bracket arm 48 can be rotated about the axis 42 upon slight loosening of the drag stop nut 50, and then retightened and locked in a desired radially projecting position with the stop pin advanced to the operational position as viewed in FIG. 6 preferably to contact the adjacent star wheel spoke 22 which defines one set point position. In a typical application, the stop pin 16 will be engaged with the associated star wheel spoke 22 to define a maximum drag tension setting position. Thereafter, if it becomes necessary to reduce the tension setting such as when a fish draws a significant quantity of line from the spool 36, the tension setting may be progressively reduced over a significant range to the lower end limit setting by rotating the star wheel counter clockwise until the opposite spoke 23 contacts the stop pin 16. Moreover, subsequent to such adjustment, the drag tension setting may be returned progressively or in a single motion to the initial setting by reverse rotation of the star wheel 18.

Figure 7:
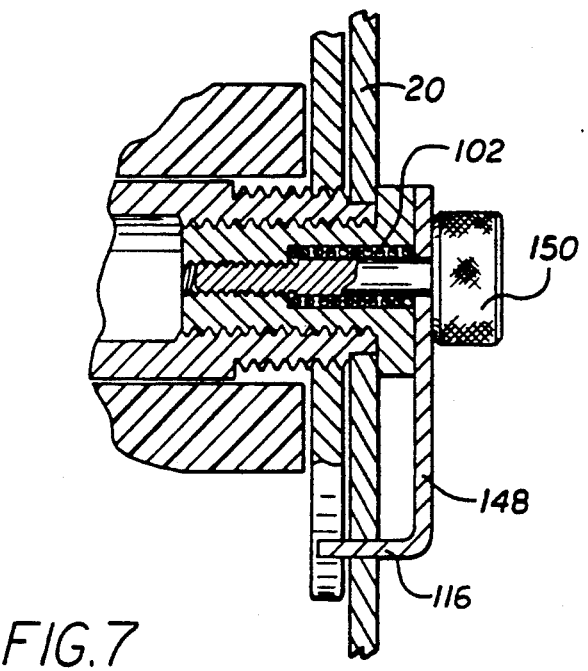
FIG. 7 is a fragmented sectional view generally similar to FIG. 6, but illustrating one alternative preferred form of the invention with a stop pin in operative association with a star wheel.
Figure 8:
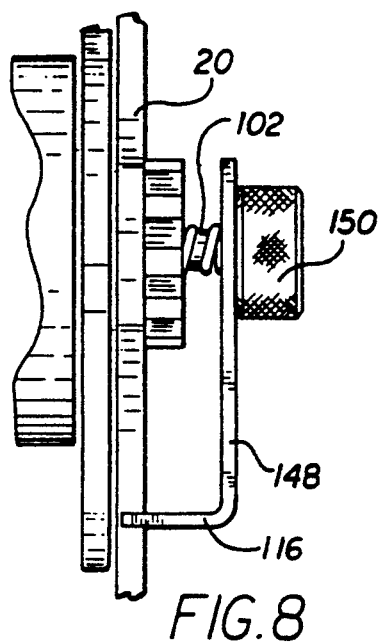
FIG. 8 is a fragmented and somewhat schematic plan view corresponding with the embodiment of FIG. 7, and illustrating the stop pin retracted from the star wheel.

FIGS. 7-13 show alternative preferred forms of the invention which may be employed generally in the same manner as described with respect to FIG. 1-6 for providing variable reference set points in a star-type drag adjustment mechanism. More particularly, FIGS. 7 and 8 depict a modified bracket arm 148 locked onto the outboard side of a reel handle 20 by means of a spring loaded drag stop nut 150. In this embodiment (FIGS. 7 and 8) the bracket arm 148 projects radially outwardly from the drag stop nut 150 and is integrally formed with a stop pin 116 turned in an inboard direction. Loosening of the drag stop nut 150 allows a compression spring 102 to displace the bracket arm 148 and associated stop pin 116 from an operative position as depicted in FIG. 7 to a retracted or inoperative position as viewed in FIG. 8.

Figure 11:
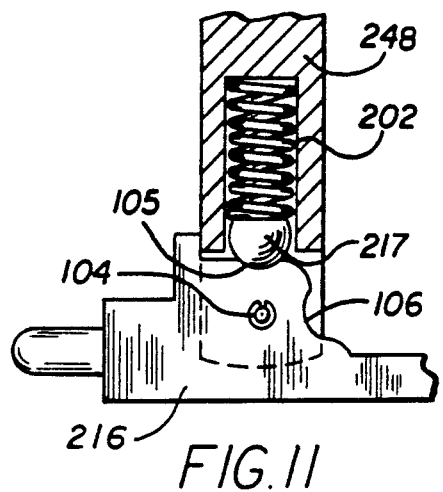

An alternative modified form for a bracket arm and stop pin are shown in FIGS. 9-11, wherein a radially outwardly projecting bracket arm 248 is connected by a pivot pin 104 to a stop pin 216. The stop pin is pivotally movable between an operational position as viewed in FIG. 9 to extend generally perpendicular to the bracket arm 248, and an inoperative position oriented generally parallel with the bracket arm as viewed in FIG. 10. A detent ball 217 (FIG. 11) is carried by the bracket arm 248 and urged by a spring 202 for seated engagement in one of a pair of detents 105 and 106 for respectively locking the stop pin 216 in the operational or retracted positions.

A still further alternative form of the bracket arm and lock pin is shown in FIGS. 12 and 13, wherein a modified bracket arm 348 has a mounting sleeve 108 at a distal end thereof. A modified stop pin 316 is slidably carried within the mounting sleeve 108 and biased by a spring 302 toward an advanced operational position as viewed in FIG. 12. A wing tab 110 at an aft end of the stop pin permits said pin to be retracted against the spring 302 to the nonoperative position as viewed in FIG. 13. A short cam 112 on the stop pin may be selectively engaged with a shaped track 114 defined by the mounting sleeve 108, upon appropriate rotation of the stop pin 316, for releasably retaining the stop pin in the advanced or retracted position.

The improved drag adjustment mechanism of the present invention thus provides a simple bracket arm and stop pin arrangement to provide preselected reference set point positions of drag tension adjustment. The invention may be applied easily and economically to existing fishing reels as a retrofit item, or as an original equipment item to provide the desired drag tension adjustment settings. With existing reels having, for example, a total of five star wheel spokes as viewed in the accompanying drawings, a range of part-circle star wheel rotation of about 60°-70° is thus permitted and provides a sufficiently broad range of drag adjustment for most applications. However, it will be understood that a modified star wheel having fewer spokes and thus permitting a larger range of part-circle adjustment may be used, if desired.

A variety of further modifications and improvements to the drag adjustment mechanism of the present invention will be apparent to those skilled in the art. Accordingly, no limitation on the invention is intended by way of the foregoing description and accompanying drawings, except as set forth in the appended claims.

What is claimed is:

1. A drag adjustment mechanism for a fishing reel having a length of fishing line wound onto a rotatable spool, a rotatable reel handle, and drive means coupled between said reel handle and said spool for rotating said spool to wind the fishing line thereon in response to rotation of said reel handle, said drag adjustment mechanism comprising:

a drag adjustment assembly connected between said reel handle and said spool for permitting rotation of said spool relative to said reel handle to unwind the fishing line from said spool in response to a tension force applied to the fishing line, said assembly including a rotatable star wheel mounted on said reel at an inboard side of said reel handle for selectively adjusting the magnitude of the tension force required to unwind the line from said spool; and a stop mechanism mounted on said reel at an outboard side of said reel handle and including pin means protruding in an inboard direction for engaging said star wheel to restrict rotational movement of said star wheel;

said star wheel including a plurality of radially outwardly projecting and circumferentially spaced spokes, said pin means protruding in an inboard direction into the circumferential space between a selected adjacent pair of said spokes to restrict rotation of said star wheel to a part-circle path with opposite end limits defined by respective contact of said spokes with said pin means.

2. The drag adjustment mechanism of claim 1 wherein said stop mechanism comprises a bracket arm projecting radially outwardly from said reel handle and having a distal end with said pin means thereon.

3. The drag adjustment mechanism of claim 2 including means for releasably locking said bracket arm to said reel handle with said bracket arm projecting radially outwardly from said reel handle in a variably selected direction.

4. The drag adjustment mechanism of claim 2 wherein said pin means is movable between a first position projecting into said space between said adjacent pair of star wheel spokes to restrict star wheel rotation, and a second position retracted from said space to permit unrestricted star wheel rotation.

5. In a fishing reel having a length of fishing line wound onto a rotatable spool, a rotatable reel handle, and drive means coupled between said reel handle and said spool for rotating said spool to wind the line thereon in response to rotation of said reel handle, a drag adjustment mechanism, comprising:
- a star-type drag adjustment assembly having a star wheel rotatably mounted in an accessible position on said reel generally at an inboard side of the reel handle and including drag clutch means responsive to the rotational position of said star wheel for permitting the line to unwind from said spool in response to a selected tension force applied to the line; and
- stop means mounted on said reel handle at an outboard side thereof for rotation therewith and including pin means protruding in an inboard direction for engaging said star wheel to restrict rotational movement of said star wheel;
- said star wheel including a plurality of radially outwardly projecting and circumferentially spaced spokes, said pin means protruding in an inboard direction into the circumferential space between a selected adjacent pair of said spokes to restrict rotation of said star wheel to a part-circle path with opposite end limits defined by respective contact of said spokes with said pin means.

6. The drag adjustment mechanism of claim 5 wherein said stop means comprises a bracket arm projecting radially outwardly from said reel handle and having a distal end with said pin means thereon.

7. The drag adjustment mechanism of claim 6 wherein said pin means is movable between a first position projecting into said space between said adjacent pair of star wheel spokes to restrict star wheel rotation, and a second position retracted from said space to permit unrestricted star wheel rotation.

8. The drag adjustment mechanism of claim 7 wherein said bracket arm and pin means are movable as a unit between said first and second positions.

9. The drag adjustment mechanism of claim 7 wherein said pin means is movably mounted on said bracket arm.

10. The drag adjustment mechanism of claim 9 wherein said pin means is threadably mounted on said bracket arm.

11. The drag adjustment mechanism of claim 9 wherein said pin means is pivotally movable with respect to said bracket arm and further including means for retaining said pin means in a selected one of said first and second positions.

12. The drag adjustment mechanism of claim 9 wherein said pin means is slidably movable with respect to said bracket arm, and further including means for retaining said pin means normally in said first position.

13. The drag adjustment mechanism of claim 6 including means for releasably locking said bracket arm to said reel handle with said bracket arm projecting radially outwardly from said reel handle in a variably selected direction.

14. The drag adjustment mechanism of claim 13 wherein said locking means comprises a drag stop nut for releasably mounting said bracket arm to said reel handle at a position generally corresponding with an axis of reel handle rotation.

* * * * *